Jan. 25, 1949.  M. J. O. LOBELLE  2,459,948
SAFETY DEVICE FOR AIRCRAFT PILOTS
Filed April 11, 1946  3 Sheets-Sheet 1
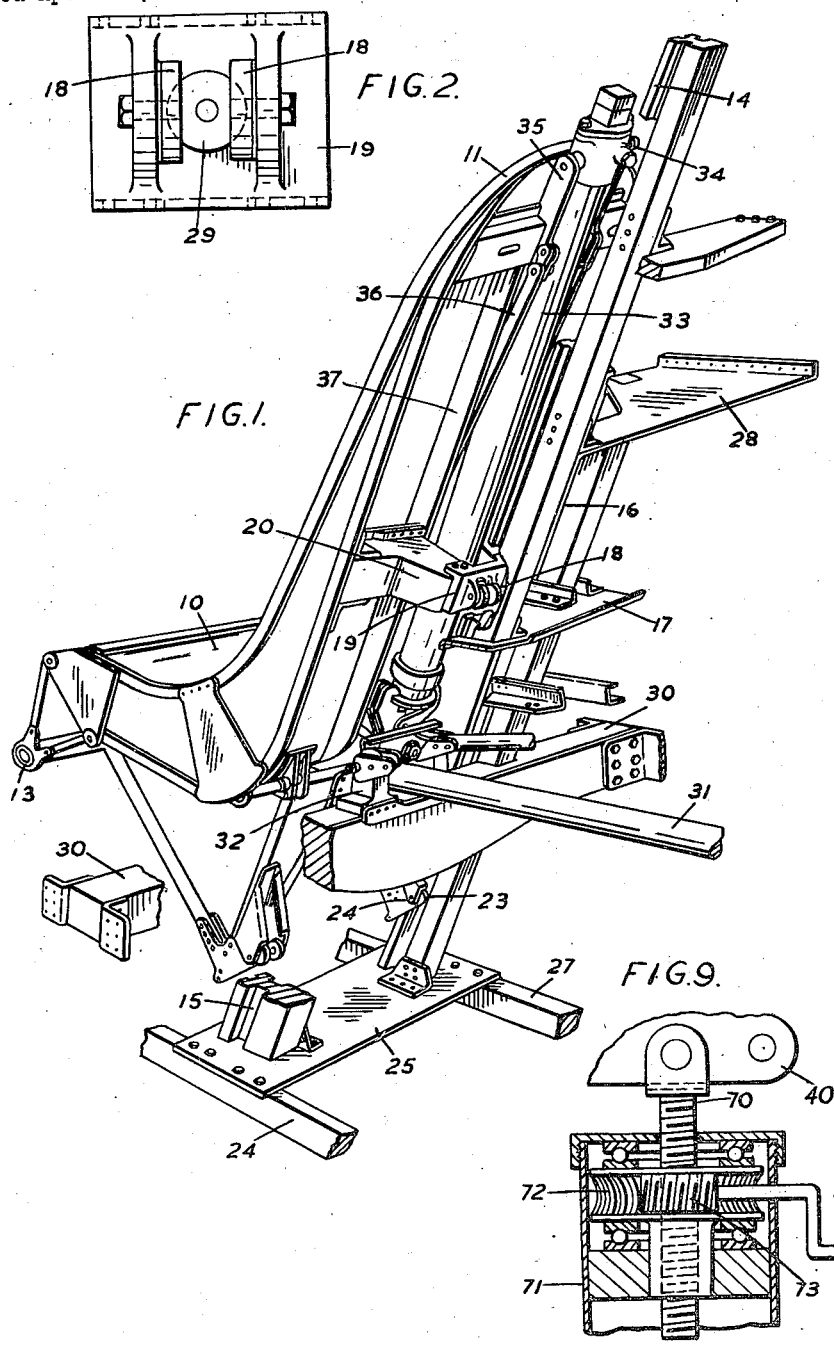
Marcel J. O. Lobelle Inventor
By Emery Holcombe
Attorney

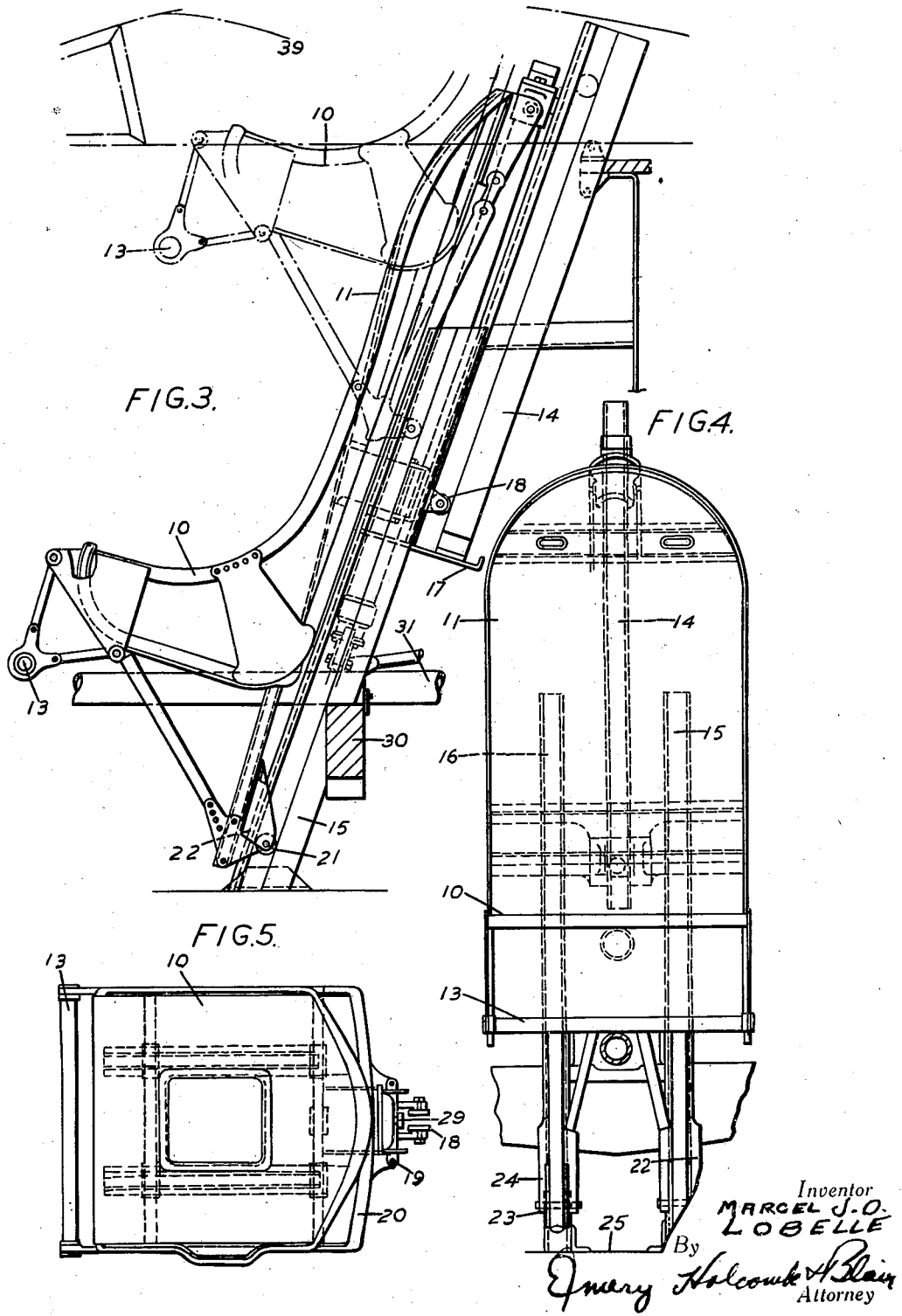

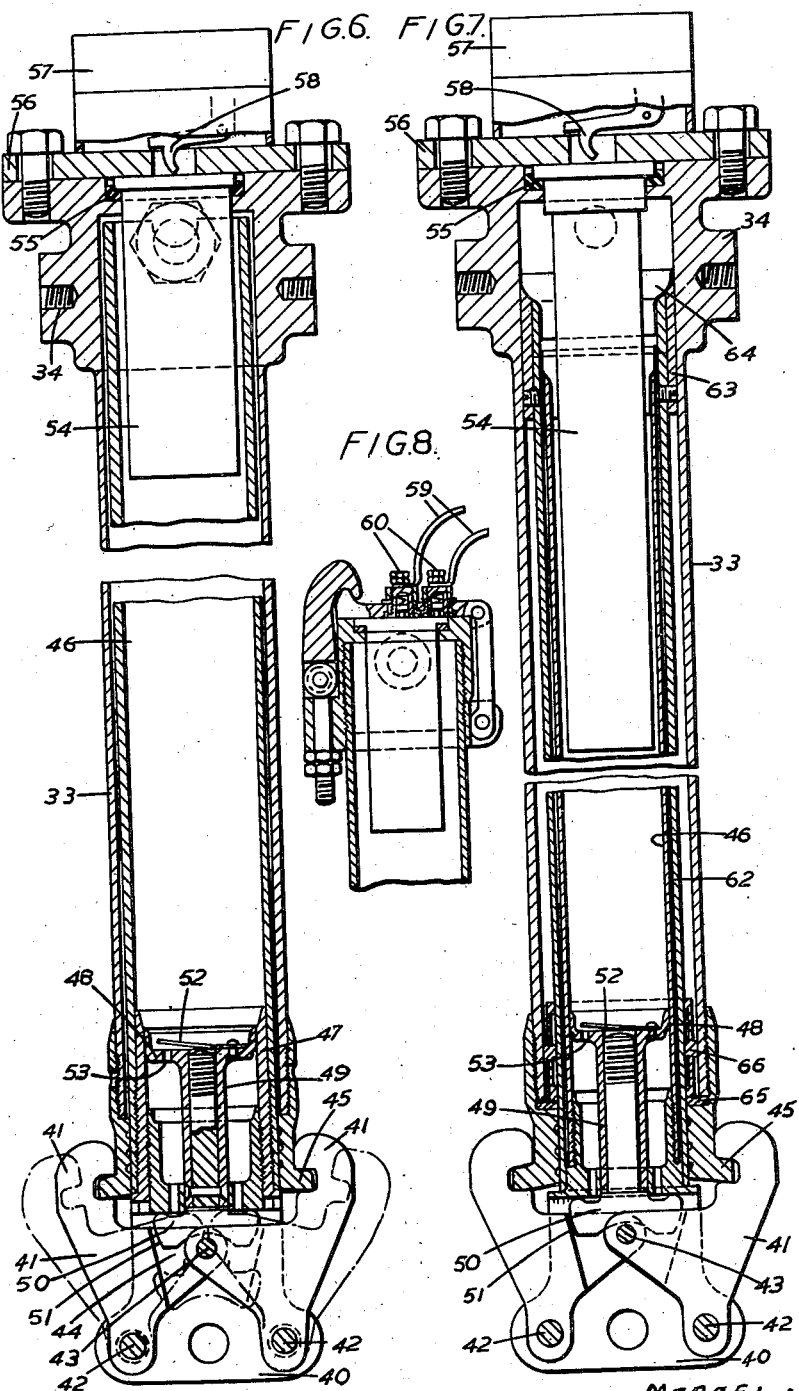

Patented Jan. 25, 1949

2,459,948

UNITED STATES PATENT OFFICE 2,459,948

SAFETY DEVICE FOR AIRCRAFT PILOTS

Marcel Jules Odilon Lobelle, Slough, England, assignor to M. L. Aviation Company, Limited, a British company Application April 11, 1946, Serial No. 661,213
In Great Britain April 12, 1945

10 Claims. (Cl. 244—122)

This invention relates to safety devices for pilots of aircraft, and it has for its object to provide mechanism whereby a pilot can be ejected with his seat from the cockpit of an areoplane so as to become airborne by a parachute, without the necessity of undoing any attachments or taking other action than pressing a button or pulling a trigger or lever to bring about his ejection. This may well be a matter of importance, particularly to pilots of aircraft who are wounded or dazed and cannot do more than press a button or pull a trigger in the hope of being rescued by parachute from a damaged aeroplane.

For this purpose according to the present invention the pilot is strapped to his seat as usual with a parachute carried either at the back or as a seat cushion beneath him, and the seat is mounted on slides so that it can rise upwards in relation to the fuselage with a guided sliding movement. It is normally held down by a mechanical device, which includes a cylinder containing a propellant charge of material such as cordite. When the pilot needs to leave the aircraft for safety while in flight, he presses a button or operates a lever which causes the charge in the cylinder to be ignited. The pressure due to the products of combustion builds up in the cylinder until it becomes sufficient to cause a locking pin to be sheared in the mechanised device locking the seat to the cockpit. Immediately after this occurs the locking device is forced open, and the pressure in the cylinder then causes the seat to slide uywards on its guide surfaces until it is free from the aircraft. The seat with the pilot upon it attains sufficient momentum relative to the fuselage to continue in upward relative movement for some little time while it clears the aircraft and then, as the pilot falls, the parachute opens out and the pilot's descent with or without the seat is controlled by parachute as usual. The seat may be released and dropped by a separate release after the pilot is safely airborne.

The invention is illustrated by way of example in the accompanying drawings in which—

Figure 1 is a perspective view of the pilot's seat and associated mechanism, the latter being partly broken away;

Figure 2 is a detail view of guide rollers;

Figure 3 shows the seat itself in side elevation;

Figure 4 shows the seat as seen from the front;

Figure 5 is a plan view thereof;

Figure 6 shows the ejector cylinder in longitudinal section;

Figure 7 shows a modified form of the ejector cylinder also in longitudinal section;

Figure 8 is a detail view showing an alternative firing mechanism; and

Figure 9 shows a further modification.

In the drawings, 10 is the seat proper and 11 the back rest. The seat and back are carried by a metal frame which supports a cross bar 13 at the front over which the pilot can tuck the heels of his shoes when about to operate the ejector, so that he will be sitting with his knees drawn up. At the back of the seat are three parallel rolled metal guide rails 14, 15 and 16. The central guide rail 14 extends upwards from a cross stay 17 in the cabin to above the seat back 11, and rollers 18 on a bracket 19 secured to supports 20 at the back of the seat embrace the side channels of the rail 14, while a roller 29 runs in the face channel. Rollers 21 on brackets 22 secured to the seat frame engage the side channels of rail 15, and rollers 23 on bracket 24 similarly engage the side channels of rail 16 at the other side. The rails 15 and 16 are secured to a plate 25 mounted on longerons 26 and 27 at the bottom of the cabin, the tops of the rails 15 and 16 being connected to the aircraft structure by gusset plates such as 28, Figure 1.

A cross frame member 30, partly broken away in Figure 1, extends across the cabin beneath the aileron torque tube 31, and it carries a bridge 32 by which the ejector mechanism is supported. The outer cylinder 33 of the ejector has a head 34 with studs at each side to which links 35 are pivoted, and these links 35 are connected to links 36 attached to rear frame members 37 of the seat back. The cylinder 33 extends freely between the supports 20 down to a releasable attachment at the bottom which is best seen in Figure 6. In this figure, a bracket 40 attached to bridge 32, and having two claws 41 pivoted to it at 42, supports the seat ejecting mechanism. These claws are connected together by lugs 44 engaging with a shearing pin 43 made of soft metal such as aluminium or brass. The claws 41 normally engage the flange of a ferrule 45 screwed on the lower end of the cylinder 33. An inner cylinder 46 slides in cylinder 33 and has a base 47 screwed into its lower end, the base 47 being attached to the bracket 40, and acting as a guide for the stem 49 of a piston 48. The stem carries a saddle 50 formed with wedge surfaces at 51, for pushing apart the claws 41 when the pin 43 is to be sheared and the claws released. The piston 48 has a flap valve 52 which closes apertures 53 in the piston when gas pressure develops in the cylinder 46, but normally stands open as shown to allow pressures to equalise inside and outside the cylinder during gradual changes of atmospheric pressure. The head 34 of the outer cylinder receives the cartridge 54 with its flange resting on a packing ring 55, and held down by an attached plate 56. The plate 56 carries the striker mechanism of suitable known type for detonating the charge, only the hammer 58 of the striker mechanism being shown. The striker mechanism is preferably of a type which is operated electrically. Alternatively the cartridge may be detonated directly by electric ignition through leads 59 connected to terminals 60 as indicated in Figure 8.

With the arrangement described, when the pilot operates the firing mechanism the charge in the cartridge 54 is ignited and gas pressure develops rapidly in the cylinder 46. The first result is to close valve 52 and to depress the piston 48 so that the wedges 51 push apart the claws 41, shearing the pin 43 and causing the claws to release the flange of ferrule 45 so freeing the outer cylinder 33 and allowing it to rise. As the gas pressure increases the head 34 is forced upwardly with cylinder 33 carrying the seat 10 upwards with it. The rollers 18 and 29, 21 and 23 guide the seat as it moves upwardly over the rails 14, 15 and 16 long enough to insure that it rises clear of the cockpit. The dotted lines in Figure 3 show the bottom part of the seat and its frame near the end of its movement while guided by the rails. The pilot has his parachute attached either on his back or beneath the seat for example, and the parachute is opened automatically when the pilot is clear of the aircraft. The pilot may be strapped to the seat so as to descend with it, or the opening of the parachute may free the pilot from the seat so that it falls separately. Of course, if the cockpit has a cover as indicated in dotted lines at 39, Figure 3, this is pushed back before the firing mechanism is operated so as to leave a clear space for the pilot and seat to pass through.

It may be desirable to spread the burning of the propellant charge over a longer period than that which obtains while the cylinder 33 travels over the fixed cylinder 46, which is easily provided for if more than two telescoping cylinders are used. For example, Figure 7 shows an arrangement in which there are three cylinders, the inner one fixed as before, and the intermediate and outer cylinders capable of extending so as to form an equivalent cylinder of nearly double their separate lengths. The inner cylinder is numbered 46 as before and the claws 41, shearing pin 43, and their associated parts are similarly numbered. The outer cylinder is also numbered 33 as before, with its head 34 and associated parts. The intermediate cylinder is numbered 62 and it has a sleeve 63 secured to it at the top to guide it in the outer cylinder 33. A thimble 64 of thin metal is accommodated in the cup-shaped top of the cylinder 62 and its sleeve 63, and extends down into the top of the inner cylinder 46 to form an effective seal to hold gas pressure at this end. At the other end a washer 65 in the shoulder of the ferrule 45 carries a shock-absorber 66 which may be a ring of metal capable of absorbing energy while it is being crushed to a shortened length. When the explosive charge in cartridge 54 is ignited the piston 48 operates as before to shear the pin 43 and spread the claws 41, allowing the outer cylinder 33 to rise with the head 34 and the pilot's seat 10 connected thereto. The gas pressure on the thimble 64 and the top of the intermediate cylinder 62 holds this latter down while the outer cylinder 33 rises, until the shock absorber 66 comes against the sleeve 63 and is crushed between this and the washer 65 in ferrule 45. The pressure exerted through the shock absorber increases over an appreciable interval of time while the intermediate cylinder is being accelerated until it rises with the outer cylinder 33, adding its length to this latter and allowing the expanding gases to do useful work in accelerating the pilot's seat upwardly until the lower end of the intermediate cylinder clears the top of the inner cylinder 46. The shock absorber 66 is required to prevent the engaging surfaces of the intermediate and outer cylinders from being sheared by their sudden impact one on the other.

The use of telescopic cylinders as above described prolongs the action of the propellant charge so that the acceleration imparted to the seat and the pilot may be more gradual than if only an inner and outer cylinder were used. The three cylinders described can be made to give an effective propelling action over a length of about 3 feet 6 inches with a mechanism which can be conveniently accommodated between the floor of the cockpit and the upper part of the back of the pilot's seat. When a less travel than this suffices, it may be unnecessary to use an intermediate cylinder, when the outer cylinder operates directly over the inner cylinder, as in Figure 6.

Whichever arrangement is adopted, the outer cylinder 33, or both the outer and intermediate cylinders 33 and 62 ultimately rise freely with the pilot's seat which then leaves the upper ends of the guide rails 14, 15 and 16, until the pilot and his seat are quite clear of the aircraft. The parachute is then allowed to open and, as the seat 10 with the pilot upon it falls, the pilot becomes air-borne. The seat may come down with the pilot, but preferably the pull on the parachute harness or other convenient means are arranged to release the straps holding the pilot to the seat, so that the seat falls away leaving the pilot to make a parachute descent alone.

If is is desired to render the pilot's seat adjustable in height, this is easily arranged by providing means such as a jack for raising and lowering the member 40 to which the base 47 of the inner cylinder 46 is attached. By raising or lowering this member 40 the ejecting cylinders and the seat are adjusted while the rollers 18, 23 and 29 roll on the guide rails. Figure 9 shows a suitable arrangement in diagrammatic form. The member 40 has connected to it a screwjack device comprising a member 70 with a screw threaded stem which works in a nut 72 in a fixed support 71. The nut 72 is formed as a worm wheel with which engages a worm 73 adapted to be turned by a handle 74. Turning of the handle operates the jack to raise or lower the seat. Obviously a hydraulically operated jack or any equivalent mechanism could be substituted for the screw jack described above.

I claim:

1. Safety device for use by an aircraft pilot comprising a pilot's seat, means for supporting and for guiding said seat with an upwardly directed motion, ejecting means comprising a plurality of telescoping cylinders, means connecting one of said cylinders to said seat, means connecting another of said cylinders to said seat-supporting means, locking members adapted normally to hold said cylinders in telescoping engagement, said locking members including a retaining means for preventing movement thereof, means for holding an explosive charge in one of said cylinders, means for igniting such a charge, and means operable by such a charge when ignited adapted to render ineffective said retaining means and release said locking members to permit relative movement of said cylinders by said charge.

2. Safety device for use by an aircraft pilot according to claim 1, wherein said locking members comprise a pair of claws and a shearing pin normally connecting them in a position engaging one of said cylinders, and said releasing means operated by said explosive charge on ignition comprises a piston in one of said cylinders and a member connected thereto adapted, when said piston is displaced by the products of an explosion, to force apart said claws and to cause said shearing pin to be sheared.

3. Safety device for use by an aircraft pilot according to claim 1, wherein said releasing means operated by an explosive charge on ignition comprises a piston in one of said telescoping cylinders, a wedge member carried by said piston adapted to force apart said locking members, and a valve on said piston adapted to allow equalisation of pressure on gradual changes of atmospheric pressure, but to close under the pressure of the gases generated by an explosive charge.

4. Safety device for use by an aircraft pilot comprising a pilot's seat, a supporting frame therefor, a plurality of guide members on said frame, a plurality of guide rails and means supporting them in an upwardly directed position, said guide rails having shaped surfaces engaged by said guide members, ejecting means adapted to hold an explosive charge, locking means adapted normally to hold down said pilot's seat, and means independent of said ejecting means and adapted to be operated by the explosion of a charge in said ejecting means for releasing said locking means.

5. Safety device for use by an aircraft pilot comprising a pilot's seat, a supporting frame therefor, a plurality of guides on said frame spaced apart, a plurality of guide rails engaging said guides, means supporting said guide rails in an upwardly directed position, ejecting means in the form of telescoping cylinders, one having a head at the top and another having a base at the bottom, means connecting the head end of the one cylinder to said pilot's seat, means connecting the base end of the other cylinder to the supporting means for said rails, means for holding an explosive charge in one of said cylinders, and means for igniting said charge, locking members adapted normally to hold said cylinders in telescoping engagement, and means independent of said ejecting means and operable by said explosive charge on ignition for releasing said locking members.

6. Safety device for use by an aircraft pilot comprising a pilot's seat, means for supporting and for guiding said seat with an upwardly directed motion, ejecting means comprising three telescoping cylinders designated respectively the outer, the intermediate and the inner cylinder, a head on said outer cylinder and means connecting it to said pilot's seat, means for supporting an explosive charge in said outer cylinder, a sleeve on the upper end of said intermediate cylinder and a co-operating flange on the lower end of said outer cylinder, means supporting said inner cylinder at its base, locking members adapted normally to hold said cylinders in telescoped engagement, and means at the base of said inner cylinder adapted to release said locking members under the pressure of gases generated by an explosive charge.

7. Safety device for use by an aircraft pilot comprising a pilot's seat, means for supporting and for guiding said seat with an upwardly directed motion, ejecting means comprising three telescoping cylinders, designated respectively the outer, the intermediate and the inner cylinder, a head on said outer cylinder and means connecting it to said pilot's seat, means for supporting an explosive charge in said outer cylinder, a sleeve on the upper end of said intermediate cylinder and a co-operating flange on the lower end of said outer cylinder, a collapsible shock absorber between said flange and said sleeve, means supporting said inner cylinder at its base, locking members adapted normally to hold said cylinders in telescoped engagement, and means at the base of said inner cylinder adapted to release said locking members under the pressure of gases generated by an explosive charge.

8. The combination with the cabin of an aircraft of a plurality of upwardly directed guide rails therein, a pilot's seat and means for guiding it upon said guide rails, a telescopic ejecting device adapted to be operated by an explosive charge, means connecting one part of said telescopic ejecting device to said seat and another part to said aircraft cabin, a lock for said telescopic ejecting device, and means operable by gases generated by an explosive charge for releasing said lock following initial development of pressure and prior to movement of said ejecting device.

9. The combination with the fuselage of an aircraft of a pilot's seat, a plurality of upwardly extending guide rails mounted on said fuselage adjacent said seat, means for guiding said seat upon said rails, a support and ejecting device for said seat comprising telescoping cylinder and piston means adapted to be operated by an explosive charge, locking means between said ejecting device and fuselage and releasing means therefor operable by the explosion of a charge in said ejecting device, and means for delaying the operation of said releasing means by the explosion of said charge until the explosion pressure exceeds the minimum necessary for smooth operation of said ejecting device.

10. The combination with the fuselage of an aircraft of a pilot's seat, a plurality of upwardly extending guide rails mounted in said fuselage adjacent said seat, means for guiding said seat upon said rails, a support and ejecting device for said seat comprising telescoping cylinder and piston means adapted to be operated by an explosive charge, locking means between said ejecting device and fuselage and releasing means therefor operable by the explosion of a charge in said ejecting device, and means including a shear pin for delaying the operation of said releasing means by the explosion of said charge, said shear pin having sufficient resistance to shearing to restrain movement of said releasing means until the explosion pressure exceeds the minimum necessary for smooth operation of said ejecting device.

MARCEL JULES ODILON LOBELLE.

(References on following page)

REFERENCES CITED

The following references are of record in the file of this patent:

UNITED STATES PATENTS

| Number | Name | Date |
|---|---|---|
| 1,337,336 | Townsley | Apr. 20, 1920 |
| 2,278,910 | Bertran | Apr. 7, 1942 |

FOREIGN PATENTS

| Number | Country | Date |
|---|---|---|
| 179,936 | Switzerland | Mar. 2, 1936 |
| 638,356 | France | Feb. 20, 1928 |